(12) United States Patent
Ciulla et al.

(10) Patent No.: US 8,888,372 B2
(45) Date of Patent: Nov. 18, 2014

(54) SENSOR-CARRIER CAP FOR A BEARING OF A WHEEL HUB

(71) Applicants: Luca Ciulla, Turin (IT); William Finetti, La Loggia Torino (IT); Philippe Weber, Fondettes (FR)

(72) Inventors: Luca Ciulla, Turin (IT); William Finetti, La Loggia Torino (IT); Philippe Weber, Fondettes (FR)

(73) Assignee: Aktiebolaget SKF, Gothenberg (SE)

( * ) Notice: Subject to any disclaimer, the term of this patent is extended or adjusted under 35 U.S.C. 154(b) by 0 days.

(21) Appl. No.: 13/869,395

(22) Filed: Apr. 24, 2013

(65) Prior Publication Data

US 2013/0278046 A1 Oct. 24, 2013

(30) Foreign Application Priority Data

Apr. 24, 2012 (IT) .......................... TO2012A000364

(51) Int. Cl.
| | | |
|---|---|---|
| F16C 19/08 | (2006.01) |
| G01P 3/42 | (2006.01) |
| B60B 27/00 | (2006.01) |
| F16C 33/72 | (2006.01) |
| F16C 41/00 | (2006.01) |
| F16C 19/38 | (2006.01) |

(52) U.S. Cl.
CPC ......... *B60B 27/0068* (2013.01); *B60B 2320/52* (2013.01); *F16C 2226/74* (2013.01); *B60Y 2200/10* (2013.01); *B60B 27/001* (2013.01); *F16C 33/723* (2013.01); *B60B 2900/141* (2013.01); *B60B 2900/115* (2013.01); *F16C 19/386* (2013.01); *B60B 27/0073* (2013.01); *F16C 41/007* (2013.01); *B60B 27/00* (2013.01); *B60B 2360/32* (2013.01); *F16C 2326/02* (2013.01); *B60B 2900/112* (2013.01)
USPC ............ 384/448; 384/539; 384/546; 384/589

(58) Field of Classification Search
CPC ................. F16C 19/386; F16C 33/723; F16C 2226/074; F16C 2326/02; B60B 27/00; B60B 27/001; B60B 27/0005; B60B 27/0068; B60B 2320/50
USPC ......... 384/448, 461, 489, 504, 537, 539, 544, 384/546–548, 589; 301/105.1; 403/326
See application file for complete search history.

(56) References Cited

U.S. PATENT DOCUMENTS

| 4,946,295 | A | * | 8/1990 | Hajzler | .................. | 384/448 |
| 5,148,104 | A | * | 9/1992 | Ishikawa | .................. | 324/173 |
| 5,172,984 | A | | 12/1992 | Lederman | | |
| 5,195,807 | A | | 3/1993 | Lederman | | |
| 5,380,103 | A | * | 1/1995 | Lederman | .................. | 384/489 |

(Continued)

FOREIGN PATENT DOCUMENTS

| DE | 29609380 U1 | 8/1996 |
| GB | 2313417 A | 11/1997 |
| JP | 2006226491 A | 8/2006 |
| JP | 2006275200 A | 10/2006 |

*Primary Examiner* — Marcus Charles
(74) *Attorney, Agent, or Firm* — Bryan Peckjian; SKF USA Inc. Patent Department

(57) ABSTRACT

A sensor-carrier cap for a bearing of a wheel hub, the cap being made of plastic material and having a bottom wall arranged transversely to a central axis and providing a seat for accommodating a sensor, a cylindrical mounting wall extending axially from one side of the bottom wall around the axis; snap locking means projecting in a radially outer direction from the cylindrical wall, for locking the sensor-carrier cap on a tubular appendage of a wheel hub-bearing.

9 Claims, 2 Drawing Sheets

(56) References Cited

U.S. PATENT DOCUMENTS

| | | | |
|---|---|---|---|
| 5,470,157 A * | 11/1995 | Dougherty et al. | 384/448 |
| 6,043,643 A * | 3/2000 | Message et al. | 324/174 |
| 6,053,637 A * | 4/2000 | Cacciatore et al. | 384/448 |
| 6,218,827 B1 * | 4/2001 | Ohmi et al. | 324/174 |
| 6,254,276 B1 * | 7/2001 | Ouchi et al. | 384/448 |
| 6,796,713 B2 * | 9/2004 | Landrieve | 384/448 |
| 6,830,379 B2 * | 12/2004 | Morita et al. | 384/448 |
| 6,877,903 B2 * | 4/2005 | Aiba et al. | 384/448 |
| 6,997,615 B2 * | 2/2006 | Takada | 384/448 |
| 7,556,435 B2 * | 7/2009 | Nagata et al. | 384/448 |
| 7,692,422 B2 * | 4/2010 | Yamamoto et al. | 384/448 |
| 7,758,248 B2 * | 7/2010 | Aida et al. | 384/489 |
| 8,210,750 B2 * | 7/2012 | Shige et al. | 384/448 |
| 2006/0159377 A1 | 7/2006 | Shigeoka et al. | |

* cited by examiner

SENSOR-CARRIER CAP FOR A BEARING OF A WHEEL HUB

CROSS-REFERENCE TO RELATED APPLICATIONS

This application claims priority to French patent application no. 1253676, filed Apr. 23, 2012, the contents of which are fully herein incorporated by reference.

FIELD OF THE INVENTION

The present invention relates to a sensor-carrier cap for a bearing of a wheel hub. The invention also relates to a hub-bearing assembly for a motor vehicle wheel.

BACKGROUND OF THE INVENTION

There are known sensor-carrier caps made of plastic material, comprising a bottom wall which has a seat for accommodating the sensor and a lateral cylindrical interface wall for mounting the cap in a wheel hub assembly. The cap is mounted in the wheel hub assembly by interference between the interface wall and an outer ring of the wheel hub assembly. The lateral mounting wall is usually provided with a reinforcement made of metallic material which stiffens the wall. See, for example, US 2006/159377 A1. In some applications, the metal reinforcement is positioned on the radially outer surface of the cylindrical wall; in other cases, the reinforcement is embedded in the plastic material of the lateral wall. This reinforcement of metallic material not only increases the production cost of the sensor-carrier caps described above, but may also cause bimetallic problems when placed in contact with the outer ring of the wheel hub assembly.

SUMMARY OF THE INVENTION

One object of the present invention is to provide a simpler cap which is more economical to manufacture. Another object of the invention is to make the mounting of the cap absolutely reliable.

These and other objects and advantages are achieved, according to the invention, by a sensor-carrier cap according to the invention as disclosed below. Preferred embodiments of the invention are defined in the dependent claims.

Briefly, the invention proposes the provision of a sensor-carrier cap which does not have a conventional metal reinforcing insert joined to the cylindrical wall. The cap is snap locked on to the outer ring of the hub-bearing assembly, by snap locking means integral with the cylindrical wall of the sensor-carrier cap. These locking means are snap locked into a recess or undercut formed in a cylindrical cavity provided in a tubular appendage or appendage of the outer bearing ring of the hub-bearing assembly.

BRIEF DESCRIPTION OF THE DRAWINGS

Some preferred embodiments of the invention will now be described, by way of non-limiting example, with reference to the attached drawings, in which.

DETAILED DESCRIPTION OF THE INVENTION

Figure 1:
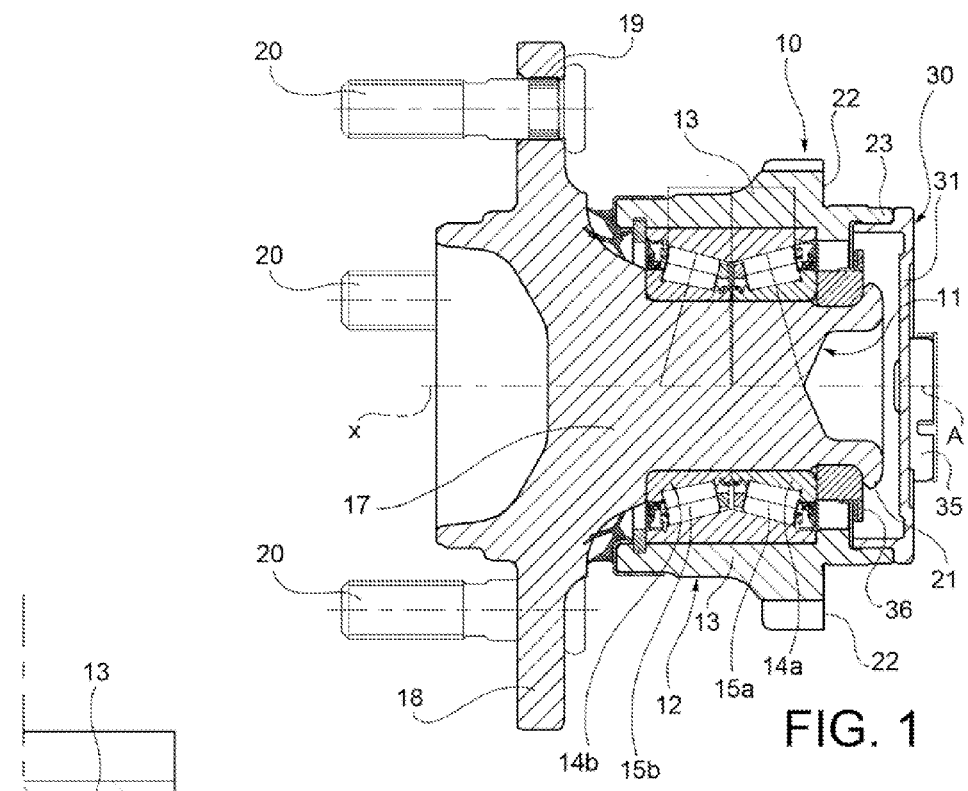
FIG. 1 is a view in axial section of a bearing assembly of a wheel hub incorporating a sensor-carrier cap.

FIG. 1 shows a hub-bearing assembly indicated as a whole by the number 10. In the embodiment shown in FIG. 1, the assembly 10 is of the third generation type for a driven wheel (not shown) of a motor vehicle. The assembly 10 comprises a central hub 11 rotatable about a central axis X of rotation, and a rolling bearing 12 which includes a fixed ring 13 positioned radially outside the hub 11, a pair of radially inner, axially adjacent rings 14a, 14b, and a double row of rolling elements, which in this example are conical rollers 15a, 15b. Throughout the present description and the appended claims, any terms and expressions indicating positions and directions, such as "radial" and "axial", are to be understood as referring to the axis of rotation x. On the other hand, expressions such as "axially inner" or "axially outer" relate to a condition in which the hub-bearing assembly is mounted on a motor vehicle.

The hub 11 forms a central cylindrical portion 17 with an integral flange 18 which extends radially outwards at an axially outer end of the hub. The flange 18 has equally circumferentially spaced axial holes 19 into which bolts 20 are inserted to fasten a wheel (not shown). The inner half-rings 14a, 14b are fastened to the hub, in a known way, by the cold forming of an edge 21 at the axially inner end of the hub, which is deformed in a radially outward direction so as to lock the half-rings axially on the central cylindrical portion 17 of the hub.

The outer ring 13 forms a radially outer mounting flange 22, adapted to be mounted on a strut (not shown) of the suspension of a vehicle, and a tubular appendage or appendage 23, which projects on the axially inner side of the bearing, in other words on the side which, in use, faces the inside of the vehicle. The tubular appendage 23 has a radially outer surface 24 of cylindrical shape, adapted to be inserted into a housing hole (not shown) formed in the suspension strut. The tubular appendage 23 also has a radially inner surface 25, coaxial with the outer cylindrical surface 24, and a flat end surface 26 which extends radially at the axially inner end of the tubular appendage 23.

The inner surface 25 comprises an axially inner cylindrical portion 25a and an axially outer undercut cylindrical portion 25b, having an inner diameter "D" greater than an inner diameter "d" of the axially inner cylindrical portion 25a. The cylindrical portions 25a and 25b are connected by a connecting portion 25c, preferably tapered in an axially inward direction, being conical for example.

A sensor-carrier cap 30, forming part of a device for detecting the wheel rotation speed, is mounted in an axially inner position on the tubular appendage 23 of the outer ring 13. The cap 30, made of plastic material, comprises a bottom wall 31 placed transversely to a central axis A, and a cylindrical wall 32, which extends axially about the axis A on one side of the bottom wall 31 and forms, jointly with the latter wall, a cavity 33. The central axis A of the cap 30 coincides, in the mounted position, with the central axis X of rotation of the hub-bearing assembly 10.

The cap 30 forms an annular peripheral projection 34 which projects radially outwards from the cylindrical wall 32 and constitutes a radially extending shoulder surface 38 facing in an axially outward direction, this surface acting as an axial shoulder of the cap to ensure the correct mounting of the cap on the tubular appendage 23.

The bottom wall 31 forms a seat 35 for accommodating a sensor (not shown). The sensor and other components of a device for detecting the rotation speed of the hub are known, and therefore need not be described in detail here. It will be sufficient to mention that the detection device further comprises an encoder, indicated schematically by 36, of annular shape, for example a rubber encoder incorporating particles of magnetized powder such as ferrite. The encoder, which can be fastened in various ways and in various positions to the rotatable hub or to another element fixed with respect to rotation to the hub, generally has magnetic north and south poles placed alternately around its circumference. The encoder is located in a position opposite the sensor, and is separated from the latter by a gap. In the present exemplary embodiment, the sensor faces the encoder in an axial direction. In other embodiments, the sensor may be mounted so as to face the encoder in a radial direction. The invention is not to be interpreted as being limited to a specific type of detection sensor and corresponding encoder.

The cylindrical wall 32 of the cap 30 is made entirely of plastic material and is therefore devoid of any conventional metal reinforcement. The cap 30 is mounted on the tubular appendage 23 both by radial interference and by snap locking. For this purpose, the cylindrical wall 32 has a radially outer surface 37 forming a step 39 axially spaced from the shoulder surface 38. The step 39 is adapted to interact by snap locking with the undercut formed by the surfaces 25b and 25c in the inner surface 25 of the tubular appendage 23.

Figure 2:
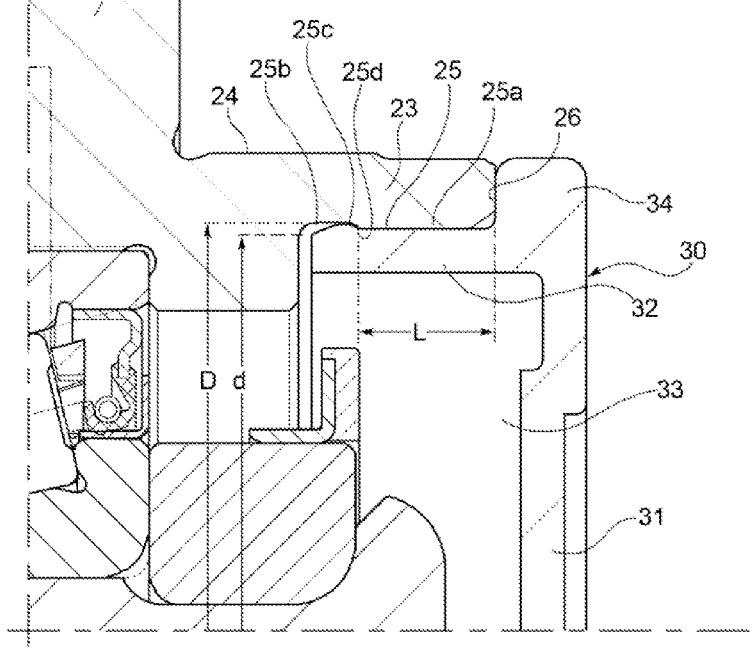
FIG. 2 is an enlarged partial view of a detail of the assembly of FIG. 1.
Figure 3:
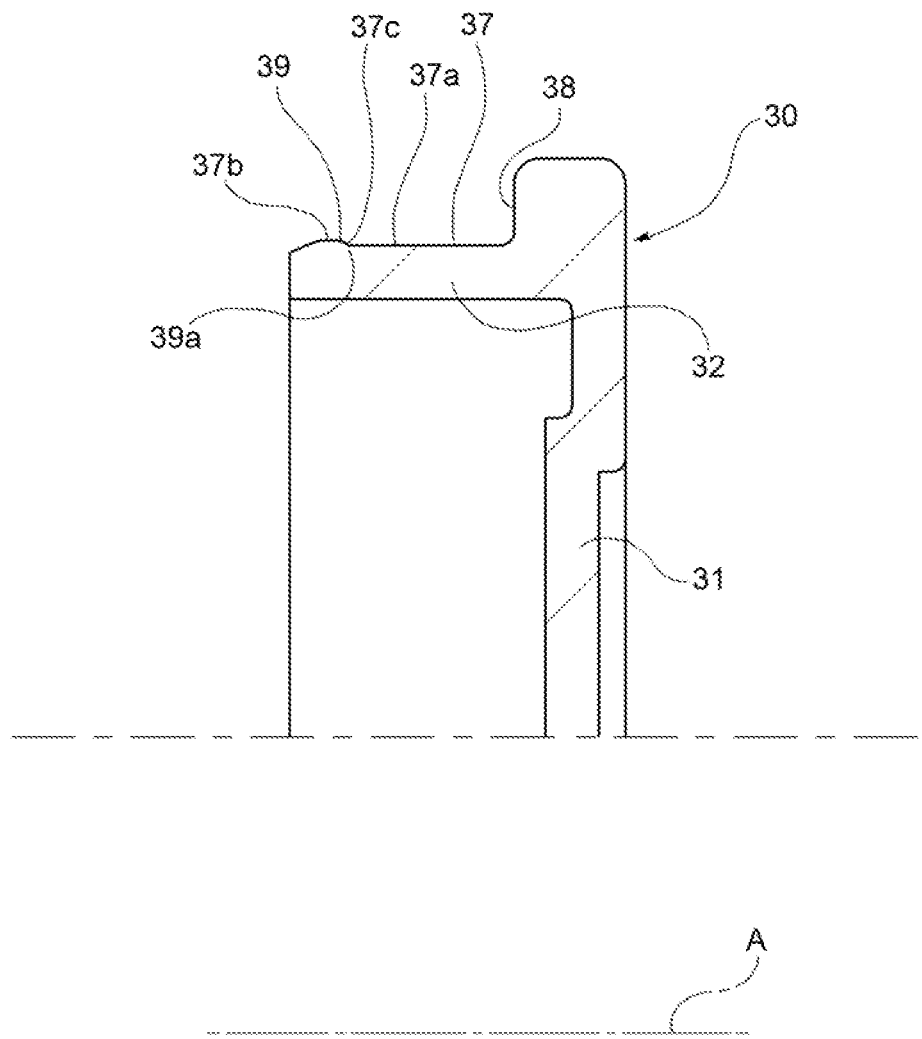
FIG. 3 is an enlarged partial view of the cap of FIG. 1.

As shown in FIGS. 2 and 3, the snap locking mechanism includes a protuberance formed at an axial end of the cylindrical wall 32 opposite from the bottom wall 31. The protuberance includes an edge portion which forms relief 37b and connecting portion 37c. When the protuberance is engaged with the undercut portion 25b of appendage 23, the protuberance is preferably axially aligned with encoder 36. In the preferred embodiment, the step 39 (FIG. 3) is formed by the following portions of the radially outer surface 37:

a cylindrical portion 37a, which extends axially from the shoulder surface 38;

an edge portion, which is axially outward in use and is spaced from the shoulder surface 38, and provides a relief 37b projecting in a radially outer direction with respect to the cylindrical surface portion 37a; and a connecting portion 37c, tapered in an axially inward direction, being conical for example, which extends between the relief 37b and the portion of cylindrical surface 37a.

In the example illustrated herein, the relief 37b (and therefore the step 39) is a circumferentially continuous relief in the form of an annular ridge. Alternatively, the relief 37b could be made in a circumferentially discontinuous form, for example as a plurality of bosses spaced apart angularly along the outer surface 37. The reference 39a indicates the circumferential line where the cylindrical portion 37a meets the step 39; 25d indicates the circumferential line where the cylindrical portion 25a joins the tapered connecting portion 25c.

The axial distance L between the line 39a and the shoulder surface 38 may be, depending on the machining tolerances, at most equal to, if not shorter than, the distance between the line 25d and the end surface 26 of the tubular appendage 23. In other words, the cylindrical surface portion 37a of the cylindrical wall 32 of the cap has an axial length L which may be at most equal to, if not shorter than, the axial length of the axially inner cylindrical portion 25a of the tubular appendage 23.

The step 39 runs along the surface 25a until it meets the cylindrical undercut portion 25b. Thus the surface 37 radially interferes with the surface 25 along the portion L. The surface 37c also forms an interference fit with the surface 25c.

Because of the configuration described above, any axial play between the cap 30 and the outer ring 13 is eliminated, and the cap is mounted stably on the outer ring of the bearing, having an additional forced fit with radial interference which makes it possible to omit the conventional reinforcing insert mentioned in the introductory part.

Preferably, at least one of the surface portions 25c and 37c is a surface tapered in an axially inward direction. When the cap 30 is mounted onto the outer ring 13, the surface portion 37c is engaged against the surface portion 25c. Because of the mutual engagement of these two tapered surfaces, and owing to the aforesaid distance L, the shoulder surface 38 of the cap is kept in abutment against the end flat surface 26 of the tubular appendage 23, thus helping to keep the cap in the correct axial position on the bearing. The choice of making both surface portions 25c and 37c in the form of surfaces tapered in an axially inward direction is even more helpful in eliminating any axial play between the cap and the outer ring.

In other embodiments (not shown), only one of the two surfaces 37c and 25c is tapered in an axially inward direction, while the other of the two (25c or 37c) may have a shape other than a tapered shape; for example, it may lie in a plane substantially perpendicular (or radial or transverse) to the axis X and the axis A.

Although certain exemplary embodiments have been illustrated in the detailed description above, it should be understood that a wide variety of hub-bearing assemblies and sensor-carrier caps can be configured in different shapes from those illustrated and described. For example, the surface portions 25a and 25b, shown here as cylindrical, could alternatively be conical. It should also be understood that the illustrated embodiments are purely exemplary and are not to be interpreted as limiting in terms of the scope, application or configuration. The drawings and the preceding detailed description will provide persons skilled in the art with a convenient guide to the application of the invention, but it is to be understood that various changes may be made to the values described, without departure from the scope of the invention as defined in the appended claims and in their legal equivalents.

The invention claimed is:

1. A sensor-carrier cap for a bearing of a wheel hub, the cap being made of plastic material and comprising:
   a bottom wall arranged transversely to a central axis (A) and providing a seat for accommodating a rotational speed detecting sensor,
   a cylindrical mounting wall extending axially from one side of the bottom wall around said axis (A), and
   snap locking means projecting in a radially outer direction from the cylindrical mounting wall, for locking the sensor-carrier cap on a tubular appendage of a wheel hub bearing, the snap locking means comprising a protuberance located on a radially outer surface of the cylindrical mounting wall at an axial end of the cylindrical mounting wall opposite from the bottom wall, the protuberance including an edge portion and a connecting portion and being configured such that, when the cylindrical mounting wall is viewed in radial cross section, none of an outer surface of the protuberance is colinearly aligned with and parallel with the radially outer surface of the cylindrical mounting wall, wherein the cylindrical mounting wall and associated snap locking means are devoid of metallic reinforcements.

2. The cap according to claim 1, further comprising an annular peripheral projection, which projects radially outwardly from the cylindrical wall and provides a radially extending shoulder surface on the side of the cylindrical wall.

3. The cap according to claim 2, wherein a step is formed by a first cylindrical portion of the radially outer surface and a portion of the protuberance as follows:
   the first cylindrical portion, which extends axially from the shoulder surface;

a second portion which is axially spaced from the shoulder surface and provides a relief projecting in a radially outer direction with respect to the cylindrical surface portion; and a third connection portion which extends between the relief and the first cylindrical portion, wherein the second portion and the third connection portion form the portion of the protuberence.

4. The cap according to claim 3, wherein the third connection portion includes a surface portion tapering from the relief towards the first cylindrical surface portion.

5. The cap according to claim 1, wherein the cylindrical wall is made entirely of plastic material and is devoid of metal reinforcing inserts.

6. A hub-bearing assembly for a wheel of a motor vehicle, the assembly comprising:

a central hub rotatable about a central axis (X) of rotation;

a rolling bearing including a stationary ring arranged radially outwardly of the central hub, and rolling elements arranged between the stationary ring and the central hub, the stationary ring forming a tubular appendage which protrudes from an axially inner side of the stationary ring and has a radially inner surface extending in an axial direction; wherein the radially inner surface provides an axially inner surface portion, an axially outer, undercut surface portion having an inner diameter (D) greater than an inner diameter (d) of the axially inner cylindrical surface portion, and a connecting surface portion which connects the axially inner surface portion and the axially outer, undercut surface portion, an encoder disposed between the central hub and the radially inner surface of the tubular appendage, and a sensor-carrier cap having;

a bottom wall arranged transversely to a central axis (A) and providing a seat for accommodating a rotational speed detecting sensor, a cylindrical mounting wall extending axially from one side of the bottom wall around said axis (A), and snap locking means projecting in a radially outer direction from the cylindrical mounting wall, for locking the sensor-carrier cap on a tubular appendage of a wheel hub bearing, and the sensor carrier cap being mounted on the tubular appendage on the stationary ring, wherein the snap locking means of the cap engage the axially outer, undercut surface portion of the tubular appendage, the snap locking means comprising a protuberance located on a radially outer surface of the cylindrical mounting wall at an axial end of the cylindrical mounting wall opposite from the bottom wall, the protuberance including an edge portion and a connecting portion and being configured such that, when the cylindrical mounting wall is viewed in radial cross section, none of an outer surface of the protuberance is colinearly aligned with and parallel with the radially outer surface of the cylindrical mounting wall, wherein the cylindrical mounting wall and associated snap locking means are devoid of metallic reinforcements, the protuberance being axially aligned with the encoder when the protuberance is engaged with the axially outer, undercut surface portion to snap lock the sensor-carrier cap thereto.

7. The assembly according to claim 6, further comprising the sensor-carrier cap having an annular peripheral projection that projects radially outwardly from the cylindrical wall and provides a radially extending shoulder surface on the side of the cylindrical wall, the stationary ring has a flat end surface, which extends radially at an axially inner end of the tubular appendage, and is in axial abutment against the shoulder surface of the sensor-carrier cap.

8. The assembly according to claim 7 further comprising the sensor-carrier cap including;

a step formed by a portion of the protuberance and a first cylindrical portion of the radially outer surface;

the first cylindrical portion, which extends axially from the shoulder surface;

a second portion, which is axially spaced from the shoulder surface and provides a relief projecting in a radially outer direction with respect to the cylindrical surface portion; and a third connection portion, which extends between the relief and the first cylindrical portion, wherein the second portion and the third connecting portion form the portion of the protuberance, and at least one of:

the third connection portion connecting the first cylindrical portion and the second cylindrical portion and engaging the tubular appendage, and the third connecting surface portion that extends between the relief and the first cylindrical portion of the outer surface of the sensor-carrier cap is a surface tapered in an axially inner direction, and wherein when the sensor-carrier cap is mounted onto the stationary ring, the third connecting surface portion is engaged against the connecting surface portion, and the shoulder surface of the sensor-carrier cap is in abutment against the flat end surface of the tubular appendage.

9. The assembly according to claim 6, further comprising a sensor-carrier cap step being formed by a portion of the protuberance and a first cylindrical portion of the radially outer surface:

the first cylindrical portion, which extends axially from the shoulder surface;

a second portion, which is axially spaced from the shoulder surface and provides a relief projecting in a radially outer direction with respect to the cylindrical surface portion; and a third connection portion which extends between the relief and the first cylindrical portion, the second portion and the third connection portion form the portion of the protuberance, and wherein the first cylindrical portion of the radially outer surface of the sensor-carrier cap has an axial length (L), and the axially inner surface portion of the tubular appendage has an axial length which is at most equal, if not shorter, than the axial length (L).

* * * * *